(12) United States Patent
Koeck et al.

(10) Patent No.: US 8,123,499 B2
(45) Date of Patent: Feb. 28, 2012

(54) COMPRESSOR ASSEMBLY

(75) Inventors: Englebert Koeck, Planegg (DE);
Juergen Mendel, Altomünster (DE)

(73) Assignee: Knorr-Bremse Systeme fur Schienenfahrzeuge GmbH, Munich (DE)

( * ) Notice: Subject to any disclaimer, the term of this patent is extended or adjusted under 35 U.S.C. 154(b) by 732 days.

(21) Appl. No.: 12/281,729

(22) PCT Filed: Mar. 8, 2007

(86) PCT No.: PCT/EP2007/002004
§ 371 (c)(1),
(2), (4) Date: Dec. 5, 2008

(87) PCT Pub. No.: WO2007/101684
PCT Pub. Date: Sep. 13, 2007

(65) Prior Publication Data
US 2009/0220359 A1   Sep. 3, 2009

(30) Foreign Application Priority Data
Mar. 8, 2006   (DE) .................. 10 2006 010 723

(51) Int. Cl.
*F04B 39/00*   (2006.01)
*F04B 53/00*   (2006.01)
*F04B 23/00*   (2006.01)

(52) U.S. Cl. ......... 417/313; 417/228; 417/281; 417/360
(58) Field of Classification Search .................. 417/313, 417/228, 281, 360, 362
See application file for complete search history.

(56) References Cited

U.S. PATENT DOCUMENTS

| 4,123,201 | A | 10/1978 | Andriulis |
| 6,364,632 | B1 | 4/2002 | Cromm et al. |
| 6,491,505 | B1 | 12/2002 | Hueser et al. |
| 2002/0134101 | A1* | 9/2002 | Gennami et al. ............... 62/469 |
| 2003/0068236 | A1* | 4/2003 | Tadano et al. ................. 417/312 |
| 2004/0001762 | A1* | 1/2004 | Matumoto et al. ............ 417/244 |
| 2004/0040339 | A1* | 3/2004 | Matsumoto et al. ........... 62/470 |
| 2004/0109772 | A1* | 6/2004 | Ogawa et al. ............. 417/410.5 |
| 2005/0053480 | A1* | 3/2005 | Murakami et al. ............ 417/313 |
| 2005/0069445 | A1* | 3/2005 | Ebara et al. ..................... 418/63 |
| 2006/0140791 | A1* | 6/2006 | Deming et al. ............ 417/410.3 |

FOREIGN PATENT DOCUMENTS

DE   43 20 692 A1   1/1995
(Continued)

OTHER PUBLICATIONS

Translation of International Preliminary Report on Patentability (IPER), PCT/EP2007/002004, Mar. 8, 2007.

*Primary Examiner* — Toan Ton
*Assistant Examiner* — Kevin Quarterman
(74) *Attorney, Agent, or Firm* — Barnes & Thornburg LLP

(57) ABSTRACT

A compressor assembly includes a support plate and a plurality of components mounted on the support plate via mechanical connections. The plurality of components includes at least a drive and a compressor for compressing air, the compressor being driven by the drive. The assembly also includes at least one line integrated into the support plate and selected ones of the mechanical connections. The line provides at least one of a fluidic connection and an electrical connection between at least two of the plurality of components.

16 Claims, 6 Drawing Sheets

FOREIGN PATENT DOCUMENTS

| | | |
|---|---|---|
| DE | 199 36 644 B4 | 2/2001 |
| DE | 10045957 C1 | 1/2002 |
| EP | 1031727 A2 | 8/2000 |
| FR | 2559553 A1 | 8/1995 |
| FR | 2798345 A | 3/2001 |
| FR | 2766878 A1 | 9/2008 |
| WO | 01/49172 A1 | 7/2001 |
| WO | 0119172 A | 7/2001 |
| WO | 02/44003 A | 6/2002 |

* cited by examiner

COMPRESSOR ASSEMBLY

CROSS-REFERENCE TO RELATED APPLICATION(S)

This application is a National Phase Application based upon and claiming the benefit of priority to PCT/EP2007/002004, filed on Mar. 8, 2007, which is based upon and claims the benefit of priority to German Patent Application No. DE 10 2006 010 723.3, filed on Mar. 8, 2006, the contents of both of which are incorporated herein by reference.

FIELD OF THE INVENTION

The present invention relates to a compressor assembly, preferably for integration into a rail vehicle for operating various compressed air consumers, having a plurality of components, at least comprising a drive and a compressor which is operated by means of the drive and has the purpose of compressing the compressed air.

BACKGROUND OF THE INVENTION

Such compressor assemblies which are particularly suitable for the requirements for integration into rail vehicles are sufficiently known. They are frequently embodied as screw-type compressors in order to supply the rail vehicle with compressed air, in order, for example, to feed a compressed-air-operated brake system. At present, in the field of railways, either modified industrial compressors are used as a compact system design with components connected via pipes, or insert units are used which have, for example, compressors which are embodied as integrated cast iron housings or welded housings. In particular in the case of compressors which are embodied with cast iron housings or welded housings, either the actual screw compressor block is inserted into a cavity which is provided for it or some of the other components which are necessary for the functioning of the compressor are integrated into the compressor housing.

DE 100 85 923 A1 discloses a compressor assembly which is provided, in particular, for use in a rail vehicle for providing compressed air. Owing to the arrangement of a drive which is connected by flanges to the end of the compressor and of further components which are arranged on the compressor housing, the compressor has only a low level of flexibility in terms of adaptation to different installation spaces, purposes of use or embodiments. In addition, external pipe connections, cabling and hose connections are necessary to connect individual components to one another fluidically or electrically.

WO 01/49172 A1 discloses a compressor assembly in the form of a pump which is a component of a blood pressure measuring device. In this compressor assembly, use is made of a functionally integrated housing which has a duct system passing through it and in this respect does not simply fulfill a mechanical attachment function. This permits at least some of the external piping which is otherwise necessary to be eliminated.

FR 2 559 553 discloses a compressor assembly for filling the compressed air system of a vehicle, which assembly is mounted with its components on a common support plate. However, this support plate does not perform any fluidic or electrical connection functions and is not part of the lubricant circuit either.

FR 2 776 878 discloses an arrangement of pneumatic components which is mounted on a common support plate which also contains fluidic ducts for the sake of functional integration. However, the degree of integration of this support plate is not so high that electrical connecting means, let alone lubricant circuit elements, are integrated into it. In addition, this support plate is not provided for attaching a compressor but rather for attaching other pneumatic components such as control units, valves etc.

EP 1 031 727 A2 discloses a compressor assembly which is provided for filling the compressed air brake system in the field of rail vehicles. However, a functionally integrated support plate comparable with the solution according to the invention is not used for the two functional principles. Although support structures into which pressure medium ducts are also integrated (FIG. 4) are present, more wide-ranging functional integration does not take place here.

SUMMARY OF THE INVENTION

One aspect of the present invention is therefore to provide a compressor assembly which is distinguished by a high level of flexibility for adaptation to a given installation space and requires little expenditure on the provision of fluidic connections.

This objective is achieved on the basis of a compressor assembly in conjunction with various characterizing features, as detailed herein.

With respect to one embodiment of the invention, at least some of the components are mechanically connected to one support plate each. Respective mechanical connections between ones of the components are provided, at least in part, with fluidic and/or electrical connections which are integrated into the support plate.

This solution provides the advantage that, owing to the plate-like design, the support plate serves both as a distributor for the media currents and as a support for the components which are arranged on the support plate. Owing to the arrangement of the components which are necessary for operation on the support plate, an extremely high level of flexibility in terms of the arrangement of the components is obtained so that adaptation to a predefined installation space is possible. Moreover, even short-term adaptations to customer requirements are possible without changing the compressor housing. The compressor can be embodied a screw-type compressor, which can be constructed in a standardized fashion irrespective of the design of the compressor assembly. The number of parts forming the device is thereby reduced, since it becomes possible to arrange a variety of components in different combinations on the same support plate in order, therefore, to achieve an extremely high number of variants for corresponding purposes of use while at the same time using a comparatively small collection of basic components.

Furthermore, the support plate not only makes available the mechanical interfaces for the components but also, owing to the fluidic connection, distributes the flow of individual media. It is contemplated that the individual media may encompass compressed air and the compressor oil, which is may be suitably conducted from one component to the next, largely by dispensing with external pipe connections and hose connections. This eliminates or reduces the number of additional sealing points, the number of parts and the mounting times, which further improves the reliability and economic implementation of the system.

The components of the device comprise, in particular, the compressor, embodied as a screw-type compressor. The device also includes a drive which drives the compressor via a direct shaft-to-shaft coupling or via a belt drive or via some other transmission stage, in which case, in particular, it is possible to distinguish between an oil-lubricated compressor and an oil-free compressor. In the case of application of an oil-lubricated compressor, it is also necessary to have an oil supply which is constructed from a plurality of devices which can also be arranged on the support plate. The drive can either be embodied as an electric drive or can comprise some other mechanical or fluidic drive. Basically, this arrangement also appears appropriate for other rotational compressors, but with modifications it can also be applied in reciprocating piston compressors.

The components of the device can either be arranged on a plane side of the support plate or can be distributed on both plane sides of the support plate. The support plate is preferably rectangular, in particular of square design, and the drive here can have a separate drive support plate. Since the support plate and the drive support plate each have lateral bores or the like for attachment elements, they can be connected to one another in a variable fashion. Owing to a, for example, square design of the support plate, it is possible, for the sake of a flexible arrangement of the individual components of the device with respect to one another, to arrange the drive support plate of the drive on all four different sides and attach it via attachment elements to the support plate. In this context, the support plate and the drive support plate are preferably arranged in a plane, and the drive of the compressor here can be implemented by means of the electrical drive motor via a belt connection or the like. Alternatively, the motor can be mounted on the support plate on the side lying opposite the arrangement of the compressor, in which case the drive shaft or the coupling connection between the drive and the compressor is guided through the support plate. Basically, the design can be composed of a single support plate or of any desired number of support plates which can have any conceivable shape, type of connection and position with respect to one another. Furthermore, the support plate itself can be manufactured in a wide variety of ways, for example as a cast iron part, with a structure which is welded, bonded, has internal pipes, is soldered or joined in some other way. In the case of an arrangement in which the support plate and the drive support plate are provided one next to the other in a plane, it is possible, in particular, to use screwed connections which are made to extend through the attachment bores which may be located on the side edge of the respective plates. In addition, in the case of drives with a transmission, the support plate can also at least in part perform functions of the transmission housing (lubrication) or of a belt drive (protection of the operator).

The support plate has integrated connecting lines in order either to conduct various media such as compressed air or oil or oil mist for the compressor or to accommodate electrical connections. As a result, pipe connections and hose connections between the components of the device are dispensed with since they are at least partially integrated into the support plate. The mechanical connections on the support plate for the individual components of the device comprise, in the first instance, attachment possibilities such as threaded bores, through-bores or other connecting means, with connections or internal contours also being provided in order to conduct fluids. Furthermore, metal-cutting geometries may be provided in the support plate in order to provide precisely dimensioned possibilities for receiving the components so that said components can be sealed simultaneously with one sealing means. As a result, for example an oil pre-separator and/or an oil fine separator can be arranged as further components in/on the support plate, and these are integrated separately into the support plate and fluidically connected via the support plate to at least one of the components. The latter are attached directly on the support plate, with the fluidic connection being produced on the flange side of the support plate or oil pre-separator or oil fine separator. Connecting the separator devices by flanges produces an enclosed pre-separator space in which, for examples for the purpose of attachment or for accommodating what are referred to as Raschig rings, filter elements or depressions corresponding to sieves are formed in the support plate. As a result, the mixture of air can flow into the separator device, in which case, after the separation of the oil, the purified air is fed on in the support plate again. The separated oil can be conducted to an oil container by means of a separate duct in the support plate. The separator device can also be cast completely or be integrally formed in some other suitable way. Adaptation to various volume flows of the compressor can be carried out, for example, by adaptation of the separator space.

A further measure which is proposed to improve the invention is that the compressor assembly comprises an oil temperature control device, and the oil temperature control device here is integrated separately into the drive support plate and is fluidically and/or electrically connected via the support plate to at least one of the components. The oil temperature control device can be embodied as an oil thermostat which can preferably be screwed into the outside of the support plate, in which case the fluid flow of oil flows past the thermostat on the inside of the support plate. As a result, there is no need for a separate device for accommodating the oil thermostat since the latter can be attached directly to/in the support plate. An advantage which results from this is also the accessibility of the oil thermostat from the outside of the device, which results in a high level of maintenance-friendliness.

For structural reasons, it is a particular advantage that in the device itself an electronic apparatus is also provided which is integrated into the support plate or is arranged separately on the support plate, in which case at least the electrical connections are integrated into the support plate or are arranged at least above the support plate. The electronic apparatus can be integrated into a terminal box which can be provided as an internal cutout in the support plate. As a result, it is possible both to provide fluidic connections in the support plate and electrical lines on the inside in order to avoid the need for external connection of the components. The terminal box can constitute here a single electrical interface for connecting external power connections or signal connections. In addition to the connections or the control for the electric drive, further electronic devices can be provided which can comprise, for example, a soft starter or a frequency converter or parts thereof, with in each case a separate housing, additional attachment parts or cable shafts, etc., being dispensed with owing to the integration. Likewise, it is possible to integrate electronic components for controlling the operating behavior or else for performing functional diagnosis of the device. The latter can also contain, if appropriate, an output unit which is likewise integrated into the support plate or provided on it. Owing to the fact that all the components are provided on the support plate by means of direct contact, there is the further advantage of dispensing with separate grounding devices.

The device can comprise, as further component, a heat exchanger which is mechanically attached to the support plate. As a result, in one contemplated embodiment, the beat exchanger can be arranged at the end side on the electric drive, laterally on the electric drive or between the electric drive and the support plate, with either a radial or axial fan design. The heat exchanger, in this embodiment, serves to cool the compressor in which the compressed air and/or the oil is cooled by a convective flow of heat or the like. The fluidic connections of the heat exchanger can also be implemented directly, depending on the location of the assembly, by means of the mechanical connections of the heat exchanger to the support plate.

As an alternative to the separately embodied heat exchanger, the support plate can have ribbing or the like through which the function of a heat exchanger is formed. The ribs can be cast on or be embodied as attached sheet-metal elements. The installation space can therefore be reduced further, and the number of individual components is reduced here by dispensing with a separate heat exchanger. According to one possible development of the invention, it is proposed that the support plate has connections for at least one oil reservoir container and/or oil separation container. Here too, the connections can be embodied either as mechanical connections or as fluidic connections so that the oil is fed directly into the container.

In one contemplated embodiment, the connecting point on the support plate which holds the oil container may have a plurality of bores for attachments, and in this context it is possible to provide at the same time an oil inflow and an oil outflow which, through the connection, forms a fluid connection in a direct sealed fashion to the surface of the support plate. In this context, a pre-heatable reservoir of oil can be provided in the support plate in order to increase the operating reliability at low temperatures for starting the compressor. Furthermore, the pre-heatable reservoir allows the oil change interval to be extended, with the pre-heating means being integrated into the support plate. Furthermore, an electric pre-heating means, in particular for the compressor oil, can also be integrated in such a way that, for example, a separate seal is dispensed with owing to the elimination of the direct introduction of the heating element into the oil. The heating means could also be located in the oil reservoir container.

The support plate advantageously forms at least part of the housing of the compressor at the mechanical connecting point to the compressor. In this context, parts of the housing of the actual screw-type compressor unit itself can be integrated into the support plate. Although this means on the one hand a loss in the particularly desirable flexibility, it permits, on the other hand, a further reduction in interfaces and a reduction in weight.

Further components which are customary for a screw-type compressor, such as an intake air filter, an intake non return valve, an intake controller, a relief valve, a minimum pressure valve for maintaining the circulation of oil, a safety valve and sound-damping measures at the air inlet/air outlet can also be provided on/in the support plate. Savings in terms of feed lines, overall size and weight are also achieved here.

In addition to the basic functions of the compressor, air conditioning functions can also be integrated or provided on the support plate. An example of this is, in particular, coarse pre-separation of water or oil after the compression process and before a dryer. In this context, the support plate can also serve as an air dryer support plate onto which, for example, containers with the desiccant are attached directly or integrated. Further air dryer functions such as valves and a heating means and an electronic control system of the dryer can also be provided or fitted directly onto the support plate, as a result of which in turn the need for separate housings can be avoided. Even if a complete air dryer unit is provided, the advantage of avoiding the need for separate attachment devices is provided.

The valves which are also provided on the support plate for the compressor may comprise minimum pressure valves for maintaining a minimum oil pressure and/or at least intake non return valves.

When the overall system is mounted, there is also the advantage that the support plate serves as a base/suspension means and therefore separate attachment parts are no longer required. Furthermore, a separate frame or carrier is dispensed with since the support plate already serves as one. The compressor assembly which is produced in this way can also be particularly easily provided with a capsule or a cover, which can be provided for esthetic or technical sound reasons, and the support plate with or without a support plate can in part or entirely perform the function of a substructure or even of a side wall thereof.

The aforesaid integration possibilities with correspondingly associated advantages of the present invention also apply to dry-running screw-type compressors, which screw-type compressors can be embodied in a single stage, double stage or multi-stage fashion, and also to compressors which are operated with other injection media such as, for example, water. In this context, only the conditions/functions which result specifically owing to the embodiment as an oil-injection machine, these being for example oil separation, a large oil reservoir etc., are dispensed with.

BRIEF DESCRIPTION OF THE DRAWINGS

Further measures which improve the invention are presented herein and/or will be presented in more detail below by means of the figures in conjunction with the description of a preferred exemplary embodiment of the invention. In the figures.

DETAILED DESCRIPTION OF EMBODIMENT(S) OF THE INVENTION

Figure 1A:
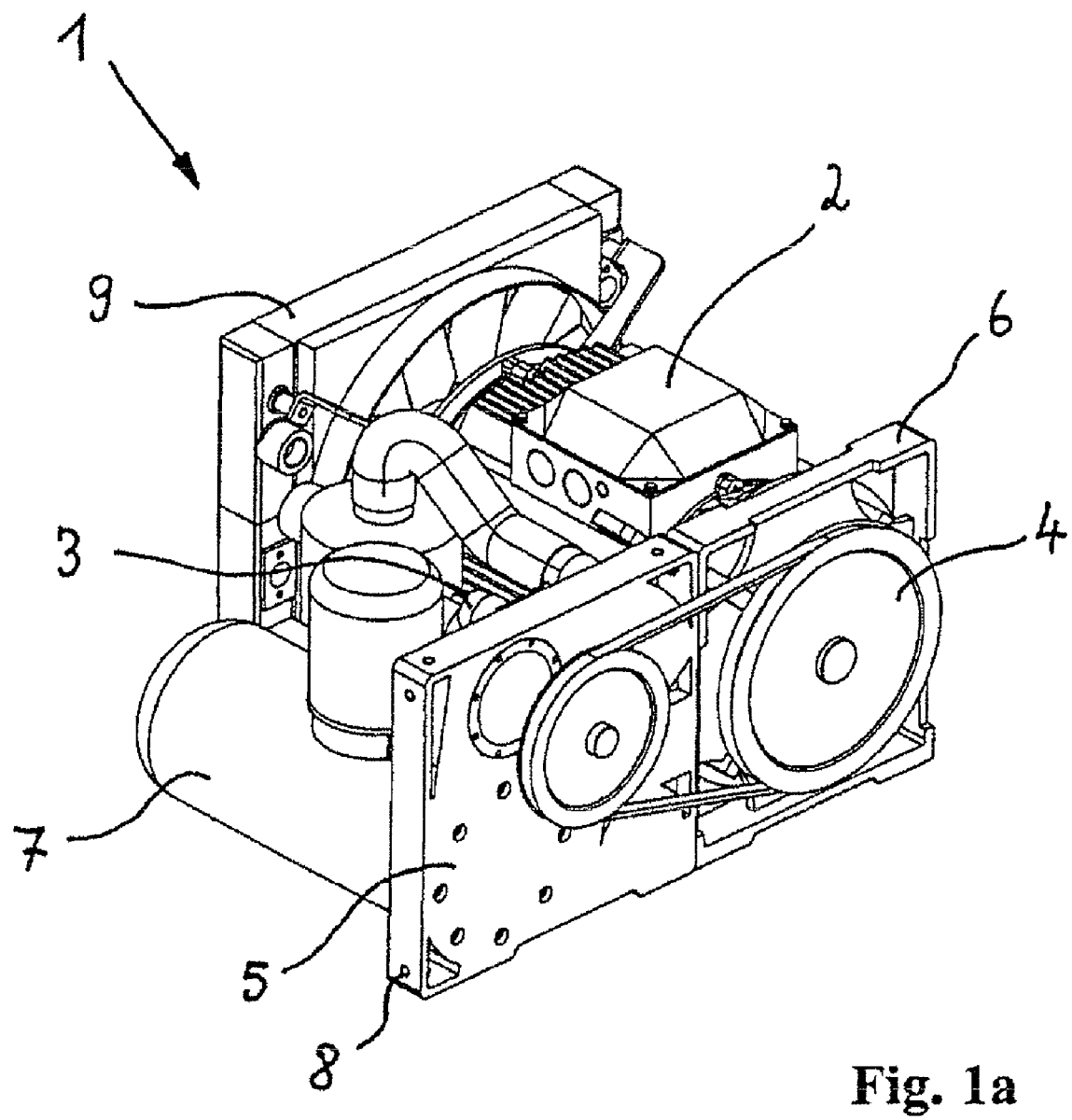
FIG. 1a is a perspective view of a compressor assembly having an electric drive which is arranged on a support plate, and a compressor which is arranged on a support plate.

The compressor assembly 1 which is illustrated in a perspective view in FIG. 1*a* is represented with the essential components in the way in which they can be installed as a slide-in module, for example in a rail vehicle, and operated. The compressor assembly 1 comprises here a drive 2, which is embodied as an electric drive according to the present exemplary embodiment. In order to compress the compressed air, a compressor 3, which is embodied as a screw-type compressor, is arranged adjacent to the drive 2, with the mechanical drive movement being transmitted by means of a belt drive 4. The support structure or frame structure of the device 1 is formed by a support plate 5 and by a drive support plate 6. The support plate 5 serves to accommodate various compressor components such as, for example, the compressor 3 or an oil reservoir container 7, while the drive support plate 6 serves to accommodate the drive 2 mechanically. The support plate 5 and the drive support plate 6 are of rectangular or square design, with both plates 5, 6 being connected to one another by means of a respective side face. According to the present exemplary embodiment, the support plate 5 is attached to the drive support plate 6 by means of attachment elements (not illustrated here), with the attachment elements being guided through attachment holes 8. Since attachment holes 8 are provided on all four side faces of the support plates 5, the drive support plate 6 can be attached to the support plate 5 from any desired direction so that it is possible to adapt the basic design as a function of the given installation space of the device 1. Both the components of the compressor side, which are arranged on the support plate 5, and the drive 2 which is arranged on the drive support plate 6 are attached to the same plane side of the respective plate 5, 6, while the belt drive 4 is arranged on the opposite side. Here, the shafts of the drive 2 and of the compressor 3 are embodied as a direct drive connection through the support plate 5 or the drive support plate 6, while the belt drive, on the opposite side, can be closed by means of a housing (not illustrated).

On the rear of the drive 2, a heat exchanger 9 is provided whose fan is also attached to the drive shaft of the drive 2, and therefore driven. The heat exchanger 9 is configured by means of a fan in such a way that the fan both generates a convection current in the heat exchanger 9 itself and cools the drive 2. The media which are to be cooled can either be the compressed air or the oil which is necessary to operate the compressor 3.

Figure 1B:
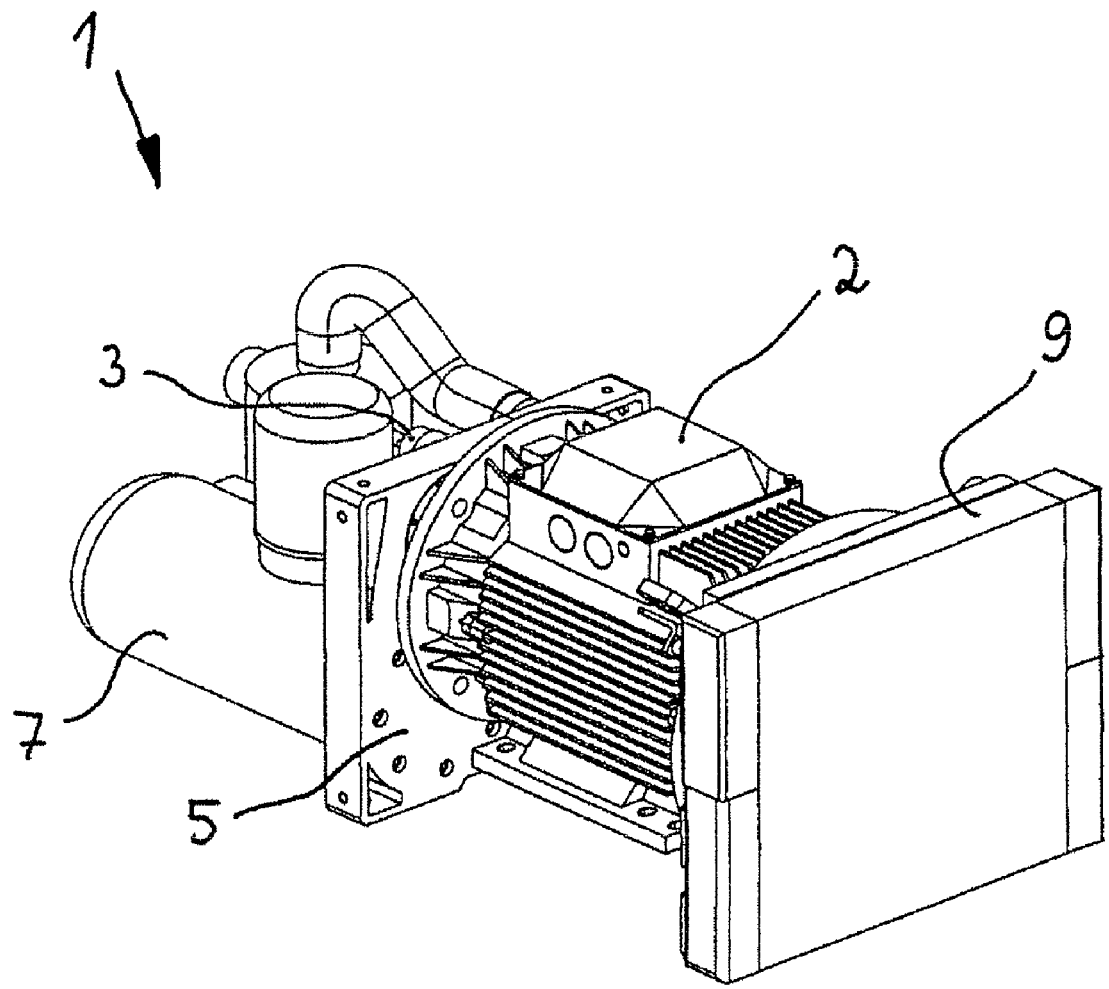
FIG. 1b is a perspective view of a further embodiment of a compressor assembly having an electric drive which is arranged on a support plate and a compressor which is arranged opposite it.

FIG. 1b shows the view of a further embodiment of a compressor assembly with an electric drive 2 and a heat exchanger 9 which is mounted downstream of it, but the drive 2 is arranged directly on the support plate 5. The compressor 3 is mounted opposite so that the drive support plate 6 is dispensed with. The support plate 5 therefore takes up all the essential components, while the drive of the compressor 3 is provided by means of a drive shaft which runs through the support plate 5.

Figure 2:
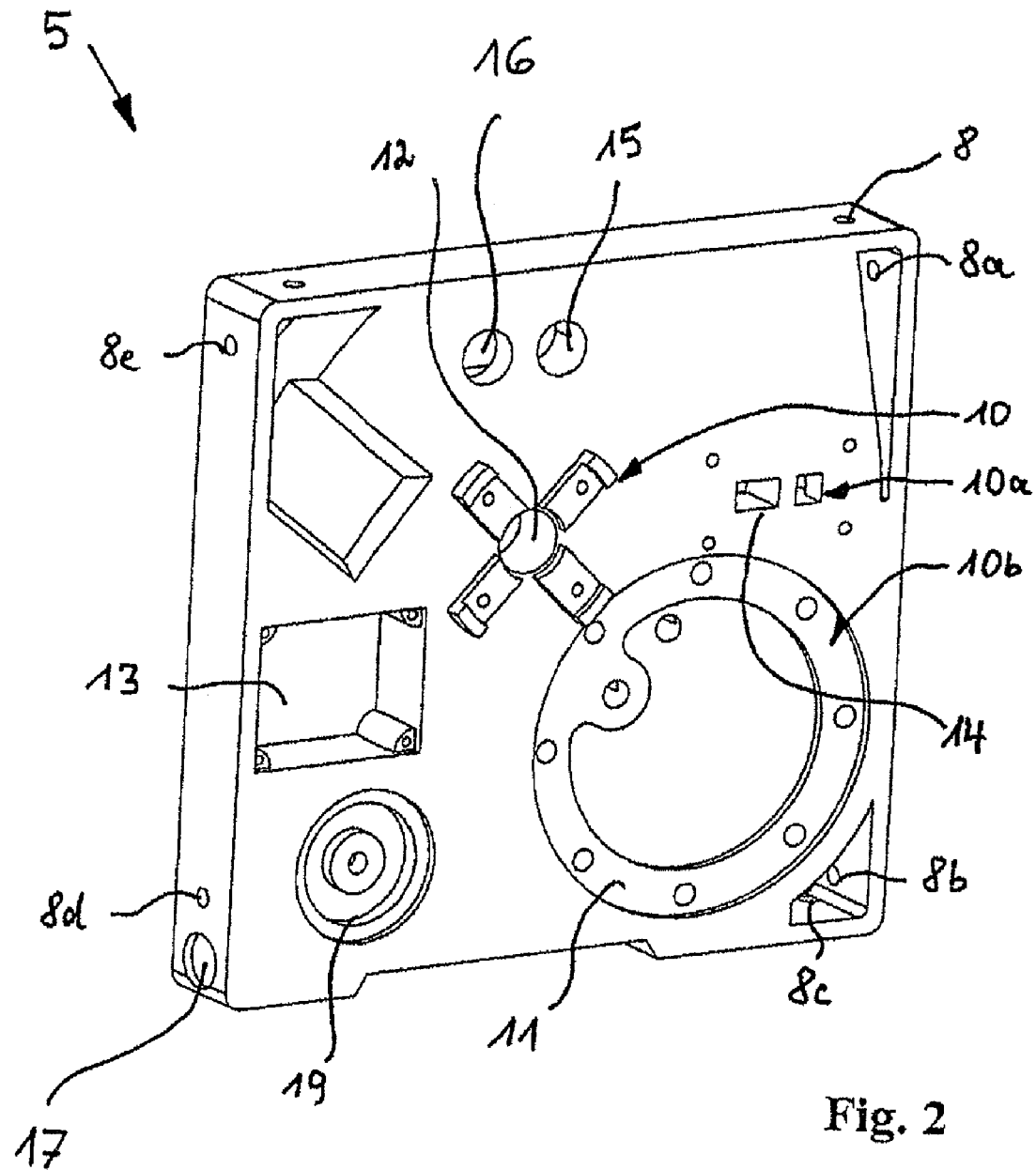
FIG. 2 is a perspective view of the support plate from the fastening direction of the compressor assembly.
Figure 3:
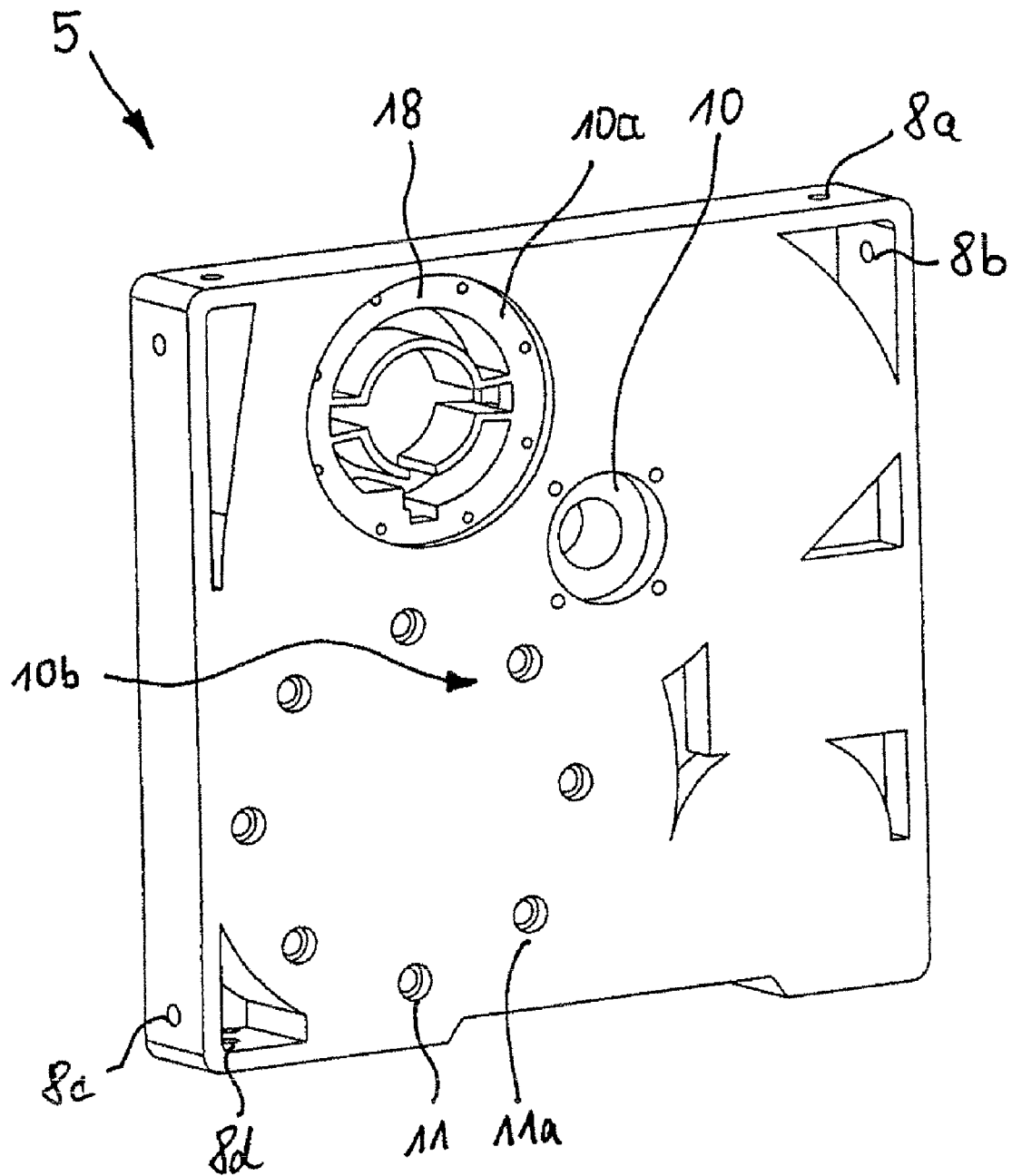
FIG. 3 is a perspective view of the support plate from FIG. 2 in a rear view.

In FIG. 2 and in FIG. 3 the support plate 5 is illustrated in a perspective view, and in FIG. 2 it is illustrated from the attachment side of the compressor components such as the compressor 3, while in FIG. 3 the support plate 5 is illustrated from the attachment side of the drive 2. The attachment plate 5 has a number of connections 10, which comprise both a mechanical connection of the individual components to the support plate 5 as well as fluidic connections. The connections 10 are configured in such a way that connection features corresponding to the components to be connected are provided in the support plate 5 so that, for example, an oil container connection 11, a compressor connection 12, a terminal box connection 13 for connecting electrical lines, an oil fine separator connection 14, a minimum pressure valve connection 15, a variable connection 16 and an oil thermostat connection 17 are provided. The compressor connection 12 corresponds in FIG. 3 to the connection for the drive 2 (not illustrated here), while, according to the present exemplary embodiment, the drive shafts of the drive and of the compressor comprise a direct connection, without providing a belt drive. In addition to further connections such as an oil connection 19 for accommodating a filter (FIG. 2) and an oil pre-separator space connection 18 (FIG. 3), further connections (not annotated here in more detail) for accommodating various fluidic, mechanical or electrical components are provided. The support plate 5 has, on the side faces, attachment holes 8 which are provided for mechanically attaching the drive support plate 6 so that connecting elements such as screws or the like can be fed through the attachment holes 8. Owing to the respective attachment holes on each of the sides of the support plate 5, the drive support plate 6 can be mounted on the support plate 5 from any direction.

Figure 4:
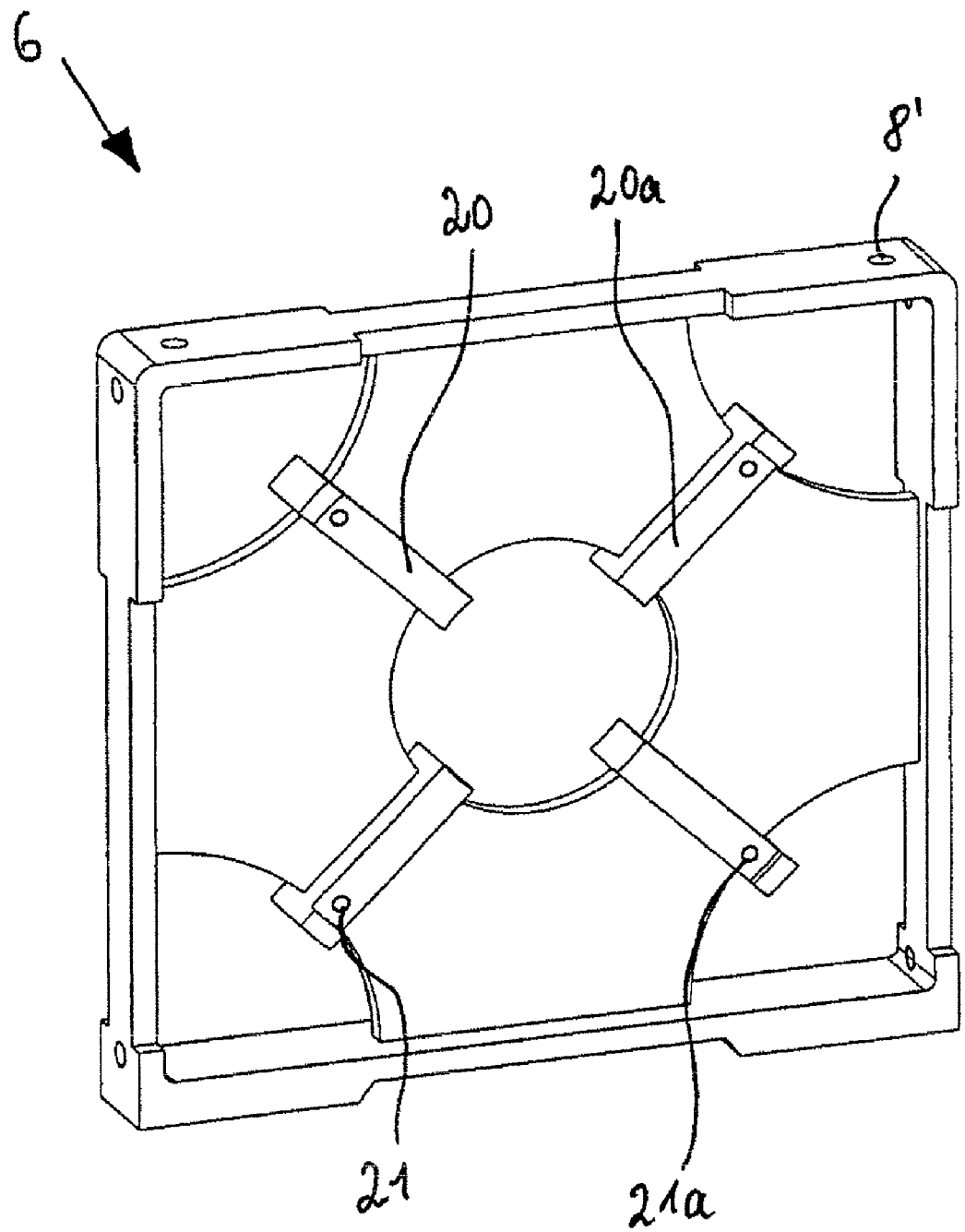
FIG. 4 is a perspective view of the support plate for holding the electric drive.

The drive support plate 6 is illustrated in FIG. 4 and serves, in particular, to accommodate the drive 2 (not illustrated here). The drive is accommodated by means of a motor centering device 20 which holds the drive in a desired position by means of movable centering elements which are directed radially inwards. These strip-shaped standard elements which form the motor centering device 20 can be worked in accordance with the motor flange so that various drives can be used. On the upper side, the strip-shaped standard elements have motor attachment bores 21 in order to attach the latter, for example, by means of a screw-type connection. In order to reduce weight and material, the drive support plate 6 can have cutouts, and in this case the material can comprise, for example, an aluminum or a cast material. As is also the case for the support plate, the drive support plate has attachment holes 8' which are arranged in such a way that they are aligned with the attachment holes 8 on the support plate in order to use common attachment elements.

Figure 5:
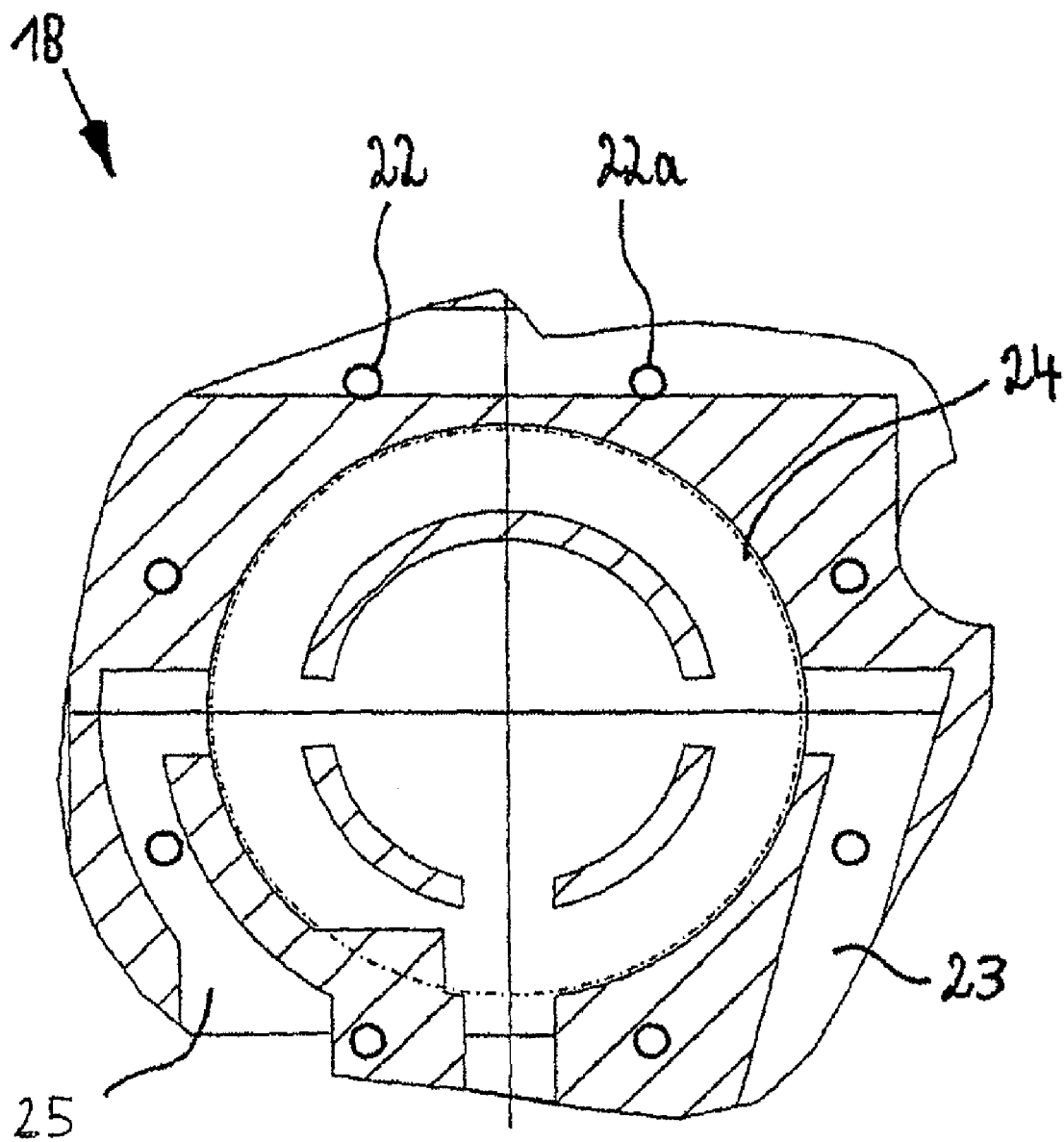
FIG. 5 is a plan view of a mechanical-fluidic connecting point of the support plate for holding an oil pre-separator.

FIG. 5 shows an oil pre-separator space connection 18 which is provided as a connection on the support plate 5. The oil pre-separator space connection 18 comprises, in addition to a mechanical connection attachment 22, fluid ducts 23 (visible through the section) which are provided on the inside of the support plate. As a result it becomes possible to provide an oil pre-separator within the device 1 without using external or exposed pipe connections or hose connections. The separated oil can be fed within the support plate to, for example, an oil container, while the compressed air flowing into the fluid duct 23 and having a high oil content can be fed to the oil pre-separator, and the purified air can be fed out of the connection via a further fluid duct 25 for re-use. According to the present example in FIG. 5, the oil pre-separator space connection 18 is provided for an oil pre-separator for large volume flows, while an oil pre-separator which is provided for small volume flows can also be provided. Within the oil pre-separator space connection 18, a Raschig ring receptacle 24 can be formed owing to a special geometric configuration of the internal contours, and according to the present exemplary embodiment the grid for a Raschig ring is represented by a dot-dash line.

The invention is not restricted in its embodiment to the preferred exemplary embodiment specified above. Instead, a number of variants which make use of the illustrated solution even with embodiments of a basically different type are conceivable. It is therefore also possible for the support plate 5 and the drive support plate 6 to be embodied in one piece.

The invention claimed is:

1. A compressor assembly, comprising:
   a support plate;
   a plurality of components mounted on the support plate via mechanical connections, wherein the plurality of components comprise at least a drive, a compressor for compressing air, the compressor being driven by the drive, an oil reservoir container, and an oil separation container;
   an oil pre-separator integrated into the support plate;
   an oil fine separator integrated into the support plate; and
   at least one line integrated into the support plate and selected ones of the mechanical connections;
   wherein the line provides at least one of a fluidic connection and an electrical connection between at least two of the plurality of components, and
   wherein the oil pre-separator and the oil fine separator are fluidically connected to the at least one line through the support plate.

2. The compressor assembly of claim 1, wherein the compressor assembly is adapted for integration into a rail vehicle.

3. The compressor assembly of claim 1, wherein the plurality of components are arranged on one side of the support plate.

4. The compressor assembly of claim 1, wherein the plurality of components are arranged on opposite sides of the support plate.

5. The compressor assembly of claim 1, wherein the support plate is rectangular in shape and comprises a separate drive support plate that is connectable to the support plate via a plurality of attachment holes therein.

6. The compressor assembly of claim 1, further comprising:
an oil temperature control device integrated into or mounted on the support plate,
wherein the temperature sensor is connected to the at least one line.

7. The compressor assembly of claim 1, further comprising:
an electronic apparatus integrated into or mounted on the support plate,
wherein the electronic apparatus is connected to the at least one line.

8. The compressor assembly of claim 7, wherein an electrical connection between the electronic apparatus and at least one from the plurality of components is arranged exterior to the support plate.

9. The compressor assembly of claim 1, further comprising:
a heat exchanger mechanically connected to the support plate,
wherein the heat exchanger is connected to the at least one line.

10. The compressor assembly of claim 1, further comprising:
a heat exchanger detachably mounted adjacent to a rear portion of the drive.

11. The compressor assembly of claim 1, further comprising:
ribs integrated into or mounted on the support plate to dissipate heat from the support plate.

12. The compressor assembly of claim 1, wherein the support plate comprises at least a portion of a housing of the compressor.

13. The compressor assembly of claim 1, further comprising:
an air dryer integrated into or mounted on the support plate.

14. The compressor assembly of claim 1, further comprising:
at least one minimum pressure valve integrated into or mounted on the support plate,
wherein the at least one minimum pressure valve maintains circulation of at least one of a lubricant and a coolant; and
at least one safety valve integrated into or mounted on the support plate.

15. The compressor assembly of claim 1, further comprising:
a housing connected to the support plate to encapsulate the plurality of components.

16. The compressor assembly of claim 7, wherein the electrical apparatus is integrated into the support plate.

* * * * *